United States Patent
Kita

(10) Patent No.: US 8,953,880 B2
(45) Date of Patent: Feb. 10, 2015

(54) IMAGE PROCESSING APPARATUS, RECORDING MEDIUM STORING IMAGE PROCESSING PROGRAM, AND METHOD OF IMAGE PROCESSING

(71) Applicant: Koji Kita, Wakayama (JP)

(72) Inventor: Koji Kita, Wakayama (JP)

(73) Assignee: NK Works Co., Ltd. (JP)

( * ) Notice: Subject to any disclaimer, the term of this patent is extended or adjusted under 35 U.S.C. 154(b) by 81 days.

(21) Appl. No.: 13/754,568

(22) Filed: Jan. 30, 2013

(65) Prior Publication Data

US 2013/0195355 A1 Aug. 1, 2013

(30) Foreign Application Priority Data

Jan. 31, 2012 (JP) ................. 2012-019345

(51) Int. Cl.
*G06K 9/00* (2006.01)
*G06T 5/00* (2006.01)
*G06T 5/20* (2006.01)

(52) U.S. Cl.
CPC . *G06T 5/002* (2013.01); *G06T 5/20* (2013.01); *G06T 2200/24* (2013.01); *G06T 2207/10024* (2013.01)
USPC .......................................................... 382/167

(58) Field of Classification Search
USPC .................. 382/167, 254, 260, 263, 264, 275
See application file for complete search history.

(56) References Cited

U.S. PATENT DOCUMENTS

| | | | |
|---|---|---|---|
| 5,926,224 A * | 7/1999 | Nagasawa | 375/240.14 |
| 7,426,313 B2 * | 9/2008 | Shohdohji | 382/260 |
| 8,693,801 B2 * | 4/2014 | Nakamura et al. | 382/264 |
| 2004/0081366 A1 * | 4/2004 | Monobe et al. | 382/261 |
| 2012/0070099 A1 * | 3/2012 | Wada et al. | 382/266 |
| 2012/0134579 A1 * | 5/2012 | Kameyama | 382/159 |

FOREIGN PATENT DOCUMENTS

JP 2005167520 A 6/2005

* cited by examiner

*Primary Examiner* — Yon Couso
(74) *Attorney, Agent, or Firm* — St. Onge Steward Johnston & Reens LLC

(57) ABSTRACT

An image processing apparatus including a dispersion calculation portion, an $\epsilon$ deriving portion, and a filtering portion, and eliminates mosquito noise from a digitally compressed image having a plurality of color components. The dispersion calculation portion is configured to calculate, for each of the color components of each pixel contained in the digitally compressed image, a dispersion of pixel values of a plurality of pixels contained in a first region in which that pixel serves as a representative pixel. The $\epsilon$ deriving portion is configured to derive, for each pixel contained in the digitally compressed image, a greatest value of the plurality of dispersions that respectively correspond to the plurality of color components of that pixel, or a corrected value of the greatest value, as an $\epsilon$ value of an $\epsilon$ filter for that pixel. The filtering portion is configured to apply the $\epsilon$ filter to the digitally compressed image.

20 Claims, 6 Drawing Sheets

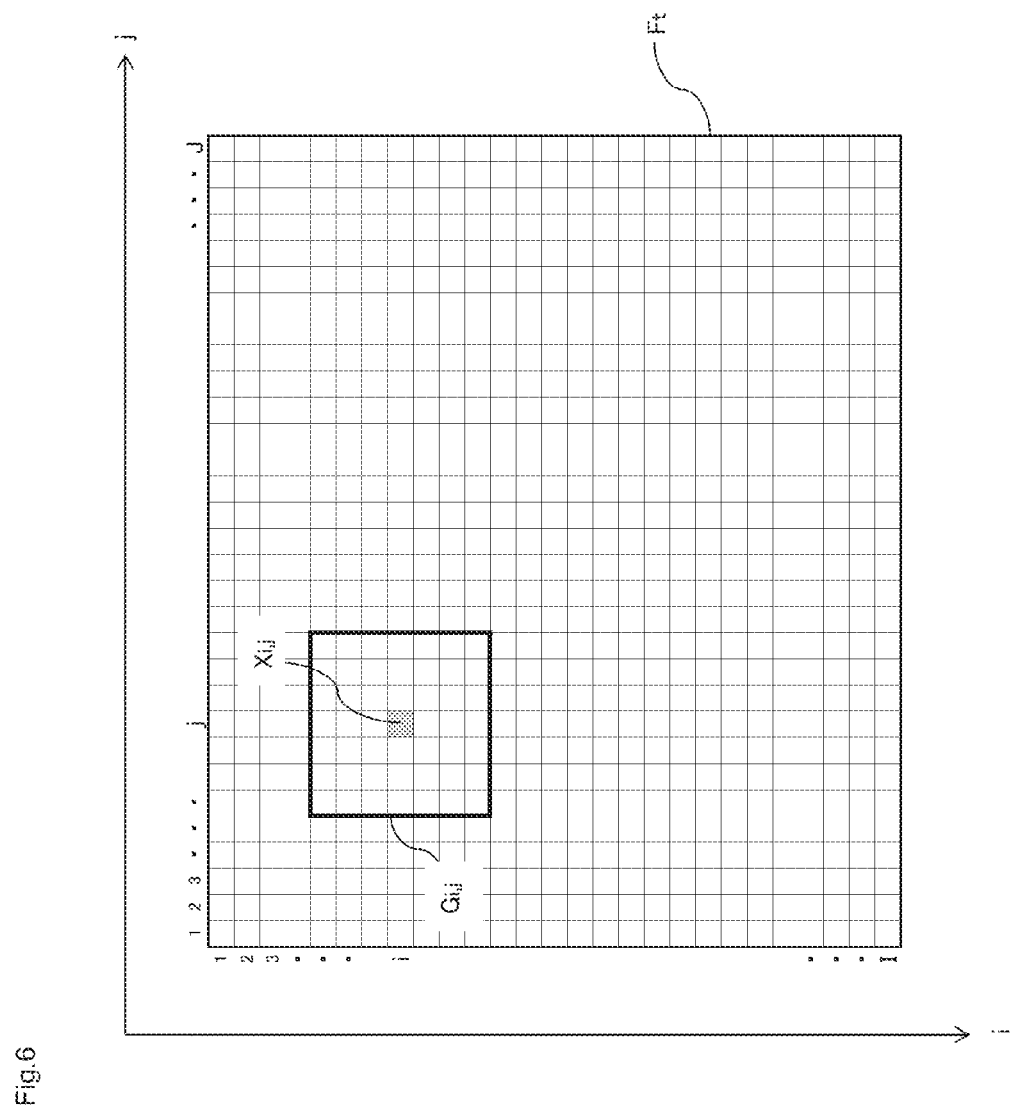

IMAGE PROCESSING APPARATUS, RECORDING MEDIUM STORING IMAGE PROCESSING PROGRAM, AND METHOD OF IMAGE PROCESSING

FIELD OF INVENTION

The present invention relates to an image processing apparatus, a recording medium storing an image processing program, and a method of image processing.

BACKGROUND OF THE INVENTION

Conventionally, a technology that removes mosquito noise from a digitally compressed image using an (epsilon) filter is known. The mosquito noise is noise that tends to occur at sharp contour portions during compression of image data with a compression format such as JPEG, MPEG, or the like. An filter is a nonlinear filter for removing mosquito noise while preserving steep changes in pixel value at the sharp contour portions and the like. JP 2005-167520A discloses two methods for removing mosquito noise, which are called "new algorithm" and "conventional algorithm".

According to the new algorithm disclosed in JP 2005-167520A, a digitally compressed image is divided into blocks having a size of N×N without overlapping. Subsequently, for each block, a standard deviation of luminance values of a plurality of pixels within that block is calculated, and the calculated standard deviation is set as an value of the filter for the pixels within that block. When the values have been derived, for each pixel of the digitally compressed image, an average value of one or more pixel values that are, among pixel values of a plurality of pixels within a block centered on that pixel and having a size of M×M, within a range of the pixel value of that pixel±$\epsilon$ is calculated and used as a corrected value of the pixel value of that pixel. The average value is calculated for each color component. The corrected value of the pixel value is a pixel value after the mosquito noise has been removed. It should be noted that in JP 2005-167520A, specific numerical values of N=8 and M=5, 7, and 9 are given for the new algorithm.

On the other hand, according to the conventional algorithm disclosed in JP 2005-167520A, for each pixel of a digitally compressed image, a variance of luminance values of a plurality of pixels within a block centered on that pixel and having a size of N×N is calculated. Subsequently, for each pixel of the digitally compressed image, the greatest value (more precisely, 0.01 times the greatest value) of a plurality of variances calculated for a plurality of pixels within a block centered on that pixel and having a size of M×M is derived as an $\epsilon$ value of the $\epsilon$ filter for that pixel. When the $\epsilon$ values have been derived, as in the case of the new algorithm, for each pixel of the digitally compressed image, an average value of one or more pixel values that are, among pixel values of a plurality of pixels within a block centered on that pixel and having a size of M×M, within a range of the pixel value of that pixel±$\epsilon$ is calculated and used as a corrected value of the pixel value of that pixel. The average value is calculated with respect to the luminance values. That is to say, the new algorithm and the conventional algorithm differ mainly in the method for calculating the $\epsilon$ values. It should be noted that in JP 2005-167520A, specific numerical values of N=7 and M=9 are given for the conventional algorithm.

In calculating the value for each pixel, the new algorithm is superior to the conventional algorithm in terms of the calculation speed. The reason for this is that according to the conventional algorithm, a variance is calculated for each pixel of a digitally compressed image, whereas according to the new algorithm, a standard deviation is calculated for each of blocks into which a digitally compressed image is divided without overlapping. However, when a standard deviation or the like is calculated for each of the blocks into which a digitally compressed image is divided without overlapping as in the case of the new algorithm, there is a possibility that the image quality of a corrected image after passing through the filter may be lower than that in the case of the conventional algorithm. The reason for this is that according to the conventional algorithm, the values for the respective pixels are calculated in units of blocks centered on the respective pixels, whereas according to the new algorithm, the values for the respective pixels are calculated in units of blocks that are not necessarily centered on the respective pixels, and thus a feature of the picture is not captured at its center.

However, there still is a problem with the conventional algorithm in terms of image quality. The reason for this is that according to the conventional algorithm, the variance is calculated only with respect to the luminance values, and with such a configuration, it is difficult to detect a contour line between objects that are the same in terms of the luminance but are different in terms of the saturation, hue, or the like, and therefore mosquito noise cannot be appropriately suppressed. It should be noted that according to the new algorithm, the standard deviation is calculated only with respect to the luminance values as well.

SUMMARY OF THE INVENTION

It is an object of the present invention to provide an image processing apparatus, a recording medium storing an image processing program, and a method of image processing that can highly precisely remove mosquito noise from a digitally compressed image.

An image processing apparatus according to a first aspect of the present invention includes a dispersion calculation portion, an $\epsilon$ deriving portion, and a filtering portion, and eliminates mosquito noise from a digitally compressed image having a plurality of color components. The dispersion calculation portion is configured to calculate, for each of the color components of each pixel contained in the digitally compressed image, a dispersion of pixel values of a plurality of pixels contained in a first region in which that pixel serves as a representative pixel. The $\epsilon$ deriving portion is configured to derive, for each pixel contained in the digitally compressed image, a greatest value of the plurality of dispersions that respectively correspond to the plurality of color components of that pixel, or a corrected value of the greatest value, as an $\epsilon$ value of an $\epsilon$ filter for that pixel. It should be noted that the corrected value of the greatest value refers to a value obtained by correcting the greatest value in accordance with a predetermined algorithm, for example, a value obtained by multiplying the greatest value by a predetermined factor. The filtering portion is configured to apply the $\epsilon$ filter to the digitally compressed image.

Here, for each pixel contained in the digitally compressed image, a dispersion of pixel values is calculated on a color component-by-color component basis, in a unit of first region in which that pixel serves as a representative pixel. It should be noted that the dispersion is an indicator indicating dispersion of a population, such as standard deviation, variance, or the like. Accordingly, the sensitivity for detecting a contour line between objects that are different in terms of the saturation, hue, or the like is increased, and therefore it is possible to appropriately suppress mosquito noise. Furthermore, here, as the $\epsilon$ value of the $\epsilon$ filter for each pixel contained in the digitally compressed image, the greatest value of the plurality of dispersions that are calculated for that pixel and respectively correspond to the plurality of color components, or a corrected value thereof, is calculated. Thus, the $\epsilon$ value is a value obtained by taking the plurality of color components into account, so that it is possible to detect a contour line that would be undetectable with an $\epsilon$ value based on the luminance, a single color component, or the like, and therefore to appropriately suppress mosquito noise. Accordingly, it is possible to highly precisely remove mosquito noise from a digitally compressed image.

An image processing apparatus according to a second aspect of the present invention is the image processing apparatus according to the first aspect, wherein the filtering portion is configured to apply the $\epsilon$ filter to the digitally compressed image on a color component-by-color component basis.

Here, for each color component, the digitally compressed image is filtered with the $\epsilon$ filter. It should be noted that the $\epsilon$ value of the $\epsilon$ filter is shared by the plurality of color components. Accordingly, it is possible to even more highly precisely remove mosquito noise from a color digitally compressed image having a plurality of color components.

Image processing apparatuses according to third and fourth aspects of the present invention are, respectively, the image processing apparatuses according to the first and second aspects, wherein the representative pixel of the first region is a pixel approximately at the center of the first region.

Here, for each pixel contained in the digitally compressed image, a dispersion and hence an $\epsilon$ value are calculated in a unit of first region in which that pixel is approximately at the center thereof. That is to say, populations of values serving as the basis for calculation of the dispersions and the $\epsilon$ values are set appropriately. Accordingly, the $\epsilon$ filter is improved.

Image processing apparatuses according to fifth through seventh aspects of the present invention are, respectively, the image processing apparatuses according to the first through third aspects, wherein for each pixel contained in the digitally compressed image, the filtering portion is configured to calculate, as a corrected value of a pixel value of that pixel, a representative value of one or more pixel values that are, among pixel values of a plurality of pixels contained in a second region in which that pixel serves as a representative pixel, within a predetermined dispersion range based on the $\epsilon$ value relative to the pixel value of that pixel. It should be noted that the first region and the second region may be regions having different sizes, or may be regions having the same size.

Here, for each pixel contained in the digitally compressed image, a representative value of pixel values is calculated in a unit of second region in which that pixel serves as the representative pixel, and is used as a corrected value of the pixel value of that pixel. Accordingly, a corrected value in which mosquito noise is appropriately removed from a pixel value is calculated. It should be noted that the corrected value of the pixel value refers to a pixel value after mosquito noise has been removed.

An image processing apparatus according to an eighth aspect of the present invention is the image processing apparatus according to the fifth aspect, wherein for each pixel contained in the digitally compressed image, the filtering portion is configured to calculate, as the corrected value of the pixel value of that pixel, an average value of one or more pixel values that are, among the pixel values of the plurality of pixels contained in the second region in which that pixel serves as the representative pixel, within the predetermined dispersion range based on the $\epsilon$ value relative to the pixel value of that pixel. It should be noted that examples of the method for calculating an average value of the plurality of pixel values contained in the first region include methods in which an arithmetic mean, a geometric mean, or a harmonic mean of those pixel values is calculated.

Here, for each pixel contained in the digitally compressed image, an average value of pixel values is calculated in a unit of second region in which that pixel serves as the representative pixel, and is used as a corrected value of the pixel value of that pixels. Accordingly, a corrected value in which mosquito noise is appropriately removed from a pixel value is calculated.

Image processing apparatuses according to ninth and tenth aspects of the present invention are, respectively, the image processing apparatuses according to the fifth and eighth aspects, wherein the second region is equal to the first region.

Generally, the settings of a region (first region) for deriving the $\epsilon$ value determine the sensitivity for detecting mosquito noise. Moreover, the settings of a region (second region) for calculating the corrected value of the pixel value determine the effect of suppressing mosquito noise. In addition, if a portion of the regions reaches any contour line, both the detection result and the suppressing effect will be affected. Therefore, it is preferable that the first region and the second region for the same pixel are identical or almost identical to each other. Here, the region (first region) for deriving an $\epsilon$ value for a certain pixel and the region (second region) for calculating a corrected value of the pixel value of that pixel are identical to each other. Accordingly, it is possible to even more highly precisely remove mosquito noise from a digitally compressed image.

Image processing apparatuses according to eleventh through sixteenth aspects of the present invention are, respectively, the image processing apparatuses according to the first, second, third, fifth, eighth and ninth aspects, wherein processing for calculating the dispersions by the dispersion calculation portion and processing for deriving the greatest value or the corrected value thereof by the $\epsilon$ deriving portion are configured to be executed in parallel. For example, a configuration is also possible in which for each pixel contained in the digitally compressed image, immediately after a plurality of dispersions respectively corresponding to the plurality of color components of a certain pixel have been calculated, an $\epsilon$ value for that pixel is derived.

As described above, according to the conventional algorithm disclosed in JP 2005-167520A, two processing stages are executed, in which dispersions are calculated for pixels contained in a digitally compressed image, and then, $\epsilon$ values are derived for pixels contained in the digitally compressed image. However, here, these two processing stages are combined into a single stage, and the values can be calculated in the single stage. Accordingly, the calculation load can be suppressed.

A non-transitory computer-readable recording medium according to a seventeenth aspect is a recording medium storing an image processing program configured to eliminate mosquito noise from a digitally compressed image having a plurality of color components, the image processing program causing a computer to execute a dispersion calculating step, an $\epsilon$ deriving step, and a filtering step. The dispersion calculating step is a step of calculating, for each of the color components of each pixel contained in the digitally compressed image, a dispersion of pixel values of a plurality of pixels contained in a first region in which that pixel serves as a representative pixel. The $\epsilon$ deriving step is a step of deriving, for each pixel contained in the digitally compressed image, a greatest value of the plurality of dispersions that respectively correspond to the plurality of color components of that pixel, or a corrected value of the greatest value, as an $\epsilon$ value of an $\epsilon$ filter for that pixel. It should be noted that the corrected value of the greatest value refers to a value obtained by correcting the greatest value in accordance with a predetermined algorithm, for example, a value obtained by multiplying the greatest value by a predetermined factor. The filtering step is a step of applying the $\epsilon$ filter to the digitally compressed image.

Here, for each pixel contained in the digitally compressed image, a dispersion of pixel values is calculated on a color component-by-color component basis, in a unit of first region in which that pixel serves as a representative pixel. It should be noted that the dispersion is an indicator indicating dispersion of a population, such as standard deviation, variance, or the like. Accordingly, the sensitivity for detecting a contour line between objects that are different in terms of the saturation, hue, or the like is increased, and therefore it is possible to appropriately suppress mosquito noise. Furthermore, here, as the $\epsilon$ value of the $\epsilon$ filter for each pixel contained in the digitally compressed image, the greatest value of the plurality of dispersions that are calculated for that pixel and respectively correspond to the plurality of color components, or a corrected value thereof, is calculated. Thus, the $\epsilon$ value is a value obtained by taking the plurality of color components into account, so that it is possible to detect a contour line that would be undetectable with an $\epsilon$ value based on the luminance, a single color component, or the like, and therefore to appropriately suppress mosquito noise. Accordingly, it is possible to highly precisely remove mosquito noise from a digitally compressed image.

A non-transitory computer-readable recording medium according to an eighteenth aspect of the present invention is the recording medium according to the seventeenth aspect, wherein the applying the $\epsilon$ filter includes applying the $\epsilon$ filter to the digitally compressed image on a color component-by-color component basis.

Here, for each color component, the digitally compressed image is filtered with the $\epsilon$ filter. It should be noted that the $\epsilon$ value of the $\epsilon$ filter is shared by the plurality of color components. Accordingly, it is possible to even more highly precisely remove mosquito noise from a color digitally compressed image having a plurality of color components.

A method of image processing according to a nineteenth aspect of the present invention is a method of image processing for eliminating mosquito noise from a digitally compressed image having a plurality of color components, the method including a dispersion calculating step, an $\epsilon$ deriving step, and a filtering step. The dispersion calculating step is a step of calculating, for each of the color components of each pixel contained in the digitally compressed image, a dispersion of pixel values of a plurality of pixels contained in a first region in which that pixel serves as a representative pixel. The $\epsilon$ deriving step is a step of deriving, for each pixel contained in the digitally compressed image, a greatest value of the plurality of dispersions that respectively correspond to the plurality of color components of that pixel, or a corrected value of the greatest value, as an $\epsilon$ value of an $\epsilon$ filter for that pixel. It should be noted that the corrected value of the greatest value refers to a value obtained by correcting the greatest value in accordance with a predetermined algorithm, for example, a value obtained by multiplying the greatest value by a predetermined factor. The filtering step is a step of applying the $\epsilon$ filter to the digitally compressed image.

Here, for each pixel contained in the digitally compressed image, a dispersion of pixel values is calculated on a color component-by-color component basis, in a unit of first region in which that pixel serves as a representative pixel. It should be noted that the dispersion is an indicator indicating dispersion of a population, such as standard deviation, variance, or the like. Accordingly, the sensitivity for detecting a contour line between objects that are different in terms of the saturation, hue, or the like is increased, and therefore it is possible to appropriately suppress mosquito noise. Furthermore, here, as the $\epsilon$ value of the $\epsilon$ filter for each pixel contained in the digitally compressed image, the greatest value of the plurality of dispersions that are calculated for that pixel and respectively correspond to the plurality of color components, or a corrected value thereof, is calculated. Thus, the $\epsilon$ value is a value obtained by taking the plurality of color components into account, so that it is possible to detect a contour line that would be undetectable with an $\epsilon$ value based on the luminance, a single color component, or the like, and therefore to appropriately suppress mosquito noise. Accordingly, it is possible to highly precisely remove mosquito noise from a digitally compressed image.

A method of image processing according to a twentieth aspect of the present invention is the method according to the nineteenth aspect, wherein the applying the $\epsilon$ filter includes applying the $\epsilon$ filter to the digitally compressed image on a color component-by-color component basis.

Here, for each color component, the digitally compressed image is filtered with the $\epsilon$ filter. It should be noted that the $\epsilon$ value of the $\epsilon$ filter is shared by the plurality of color components. Accordingly, it is possible to even more highly precisely remove mosquito noise from a color digitally compressed image having a plurality of color components.

ADVANTAGEOUS EFFECTS OF INVENTION

According to the present invention, it is possible to highly precisely remove mosquito noise from a digitally compressed image.

BRIEF DESCRIPTION OF DRAWINGS

FIG. 6 is a diagram showing a pixel arrangement of a target frame.

REFERENCE SIGNS LIST

1 Image processing apparatus (computer)
2 Image processing program
$F_t$ Target frame (digitally compressed image)
$G_{i,j}$ N×N region (first region)
$H_{i,j}$ M×M region (second region)
$X_{i,j}$ Pixel
$x_{i,j}$ Pixel value
$y_{i,j}$ Corrected value of pixel value
$\sigma_{i,j}$ Standard deviation (dispersion)
$\epsilon_{i,j}$ Epsilon value ($\epsilon$ value)

DETAILED DESCRIPTION OF THE INVENTION

Hereinafter, an image processing apparatus, a recording medium storing an image processing program, and a method of image processing according to an embodiment of the present invention will be described with reference to the drawings.

1. Brief Outline of Image Processing Apparatus

Figure 1:
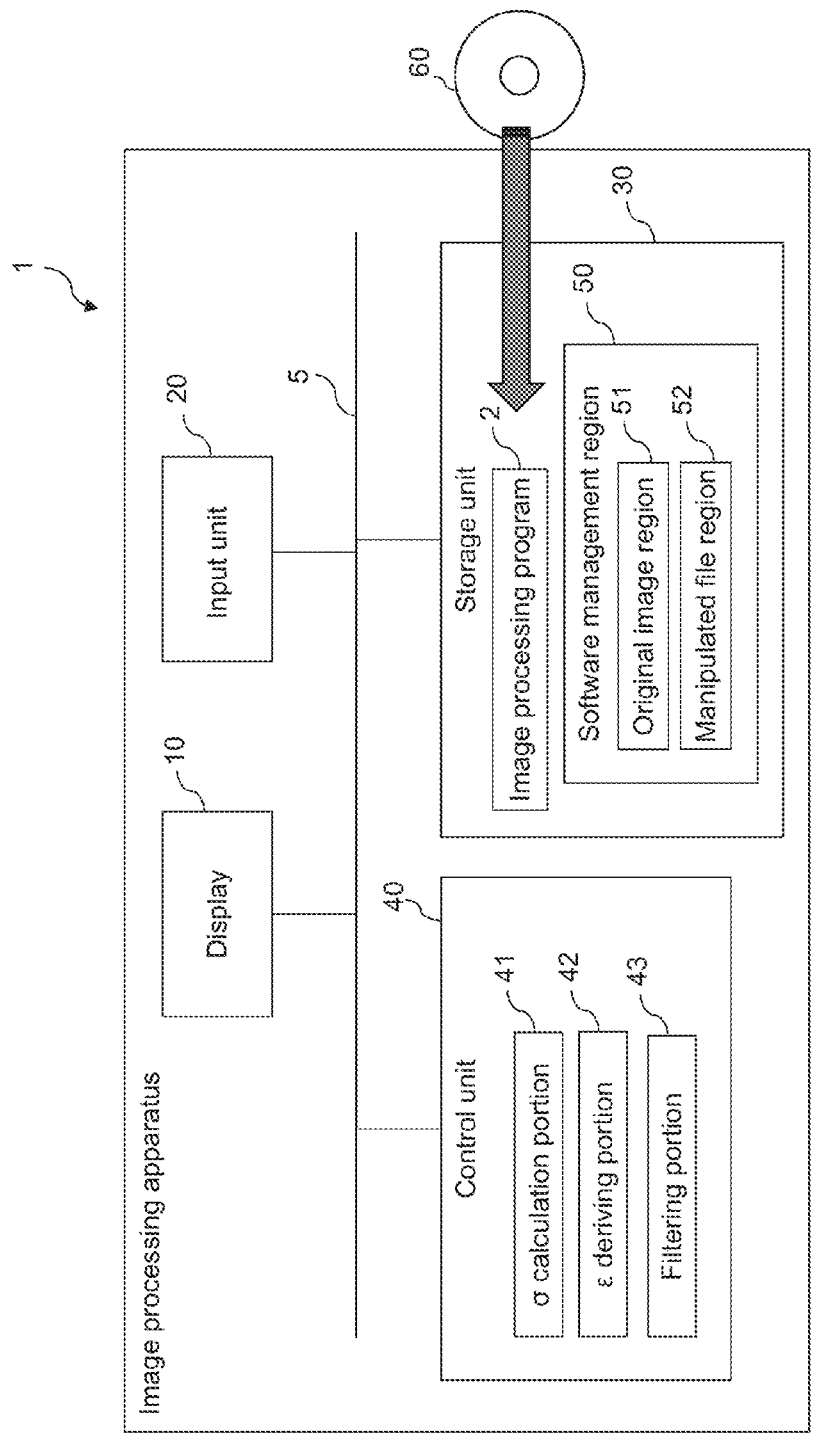
FIG. 1 is a block diagram of an image processing apparatus according to an embodiment of the present invention.

An image processing apparatus 1 shown in FIG. 1 is an embodiment of an image processing apparatus according to the present invention. The image processing apparatus 1 is a general-purpose personal computer. An image processing program 2, which is an embodiment of an image processing program according to the present invention, is installed in the image processing apparatus 1 from a computer-readable recording medium 60 such as a CD-ROM, a DVD-ROM, a Blu-ray disc, a USB memory, or the like. The image processing program 2 is application software for assisting image processing of moving images and still images. The image processing program 2 causes the image processing apparatus 1 to execute steps contained in operations that will be described later.

The image processing apparatus 1 has a display 10, an input unit 20, a storage unit 30, and a control unit 40. The display 10, the input unit 20, the storage unit 30, and the control unit 40 are connected to one another by a bus line 5 and can communicate with one another. In the present embodiment, the display 10 may be a liquid crystal display. The input unit 20 may be composed of a mouse, a keyboard, and the like. The storage unit 30 may be composed of a hard disk and the like. The control unit 40 may be composed of a CPU, a ROM, a RAM, and the like. The display 10 displays screens that will be described later and the like to a user. The input unit 20 receives a user operation on the image processing apparatus 1.

The image processing program 2 is stored in the storage unit 30. A software management region 50 is set aside in the storage unit 30. The software management region 50 is a region that is used by the image processing program 2. An original image region 51 and a manipulated file region 52 are set aside in the software management region 50. The functions of these regions 51 and 52 will be described later.

The control unit 40 reads out and executes the image processing program 2 stored in the storage unit 30, thereby virtually operating as a σ calculation portion 41, an ε deriving portion 42, and a filtering portion 43. The operations of these portions 41 to 43 will be described later.

2. Details of Configuration and Operation of Image Processing Apparatus

Figure 2:
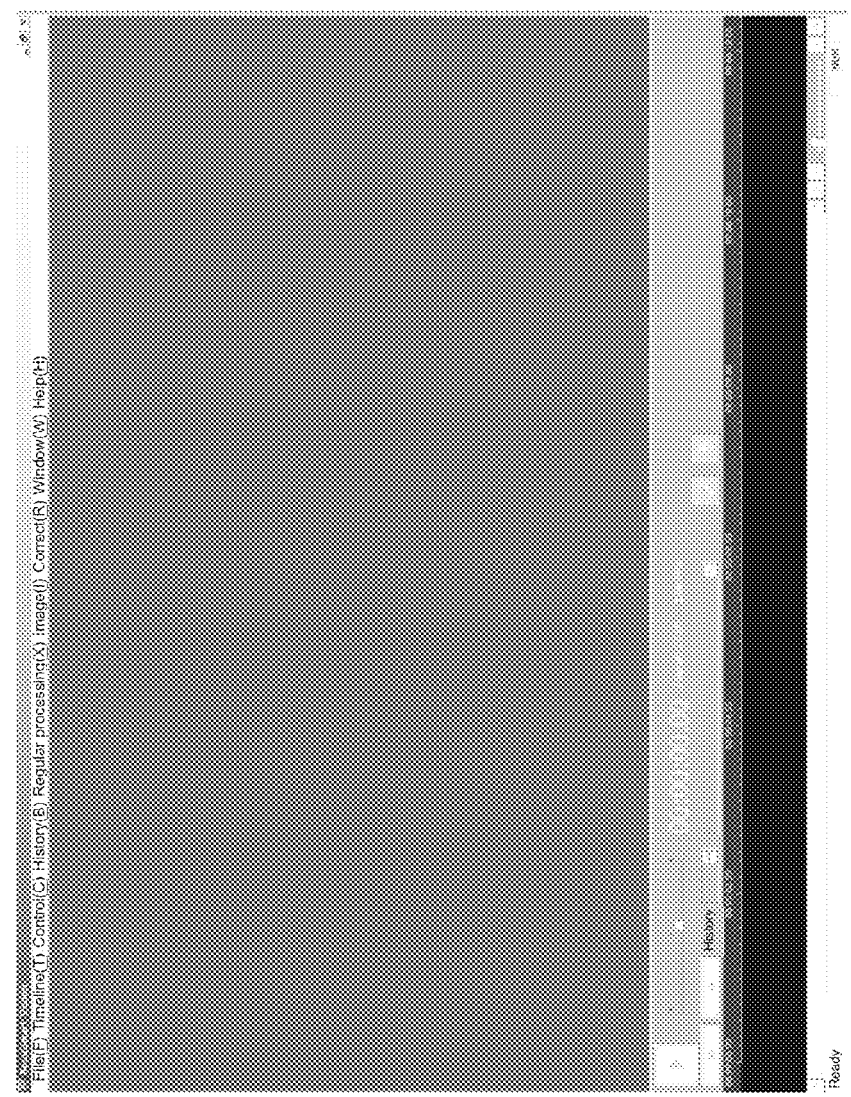
FIG. 2 shows a basic screen before image data is loaded.

When the control unit 40 detects that the user has performed a predetermined operation through the input unit 20, the control unit 40 activates the image processing program 2. When the image processing program 2 is activated, a basic screen W1 (see FIG. 2) is displayed on the display 10. It should be noted that the control unit 40 controls the display of screens, windows, buttons, and all other elements displayed on the display 10.

2-1. Image Data Loading

The basic screen W1 receives a command from the user to load image data into the original image region 51. The image data loaded into the original image region 51 will be a target of image processing that will be described later. The control unit 40 loads image data from a still image file or a moving image file into the original image region 51. It should be noted that in this specification, "still image file" refers to a data file in a still image format, and "moving image file" refers to a data file in a moving image format.

When loading image data from a still image file, the user designates a still image file or a folder by operating the input unit 20. In the former case, the control unit 40 prompts the user to input an address path in the storage unit 30 and a file name of that still image file. In the latter case, the control unit 40 prompts the user to input an address path in the storage unit 30 and a folder name of that folder. After that, the control unit 40 stores the designated still image file or all the still image files within the designated folder in the original image region 51 as a still image file group. It should be noted that "group" as used herein is not limited to a plurality of elements, and the number of elements of the group may be one.

On the other hand, when loading image data from a moving image file, the user inputs an address path in the storage unit 30 and a file name of a moving image file by operating the input unit 20. When the control unit 40 detects that the user has designated the moving image file, the control unit 40 displays a moving image loading window (not shown) such that this window is laid on the basic screen W1. The moving image loading window receives, from the user, the selection of a timeline of any length out of the entire timeline of the designated moving image file. When the control unit 40 detects that the user has selected the timeline of any length through the input unit 20, the control unit 40 generates a still image file group corresponding to that selection. This still image file group corresponds one-to-one to a frame group that is contained in a moving image of the timeline selected by the user. Afterward, the control unit 40 stores this still image file group in the original image region 51.

Accordingly, in the present embodiment, the target of image processing that will be described later is not a moving image file but a still image file. The still image file is loaded into the original image region 51 on a file-by-file basis, on a folder-by-folder basis, or in the unit of the whole or a partial timeline of the moving image file.

2-2. Reproduction of Still Image File Group

When the still image file group is loaded into the original image region 51, the control unit 40 displays a display window W2 (see FIG. 3) such that this window is laid on the basic screen W1. The display windows W2 is displayed for each loading operation for loading a still image file group into the original image region 51.

In the display window W2, first, a single still image file (for example, a still image file corresponding to the first frame on the timeline) contained in the still image file group that has been loaded into the original image region 51 is displayed. It should be noted that the control unit 40 recognizes that still image files contained in the still image file group are arranged along the timeline, even if the still image file group is derived from a still image file rather than being derived from a moving image file. The arrangement is automatically determined based on the attributes (file name, date and time of creation, date and time of update, and the like) of a file.

As will be described later, the frame displayed in the display window W2 changes in response to a user operation. The control unit 40 manages identification information of the frame that is currently displayed in the display window W2 in real time.

Figure 3:
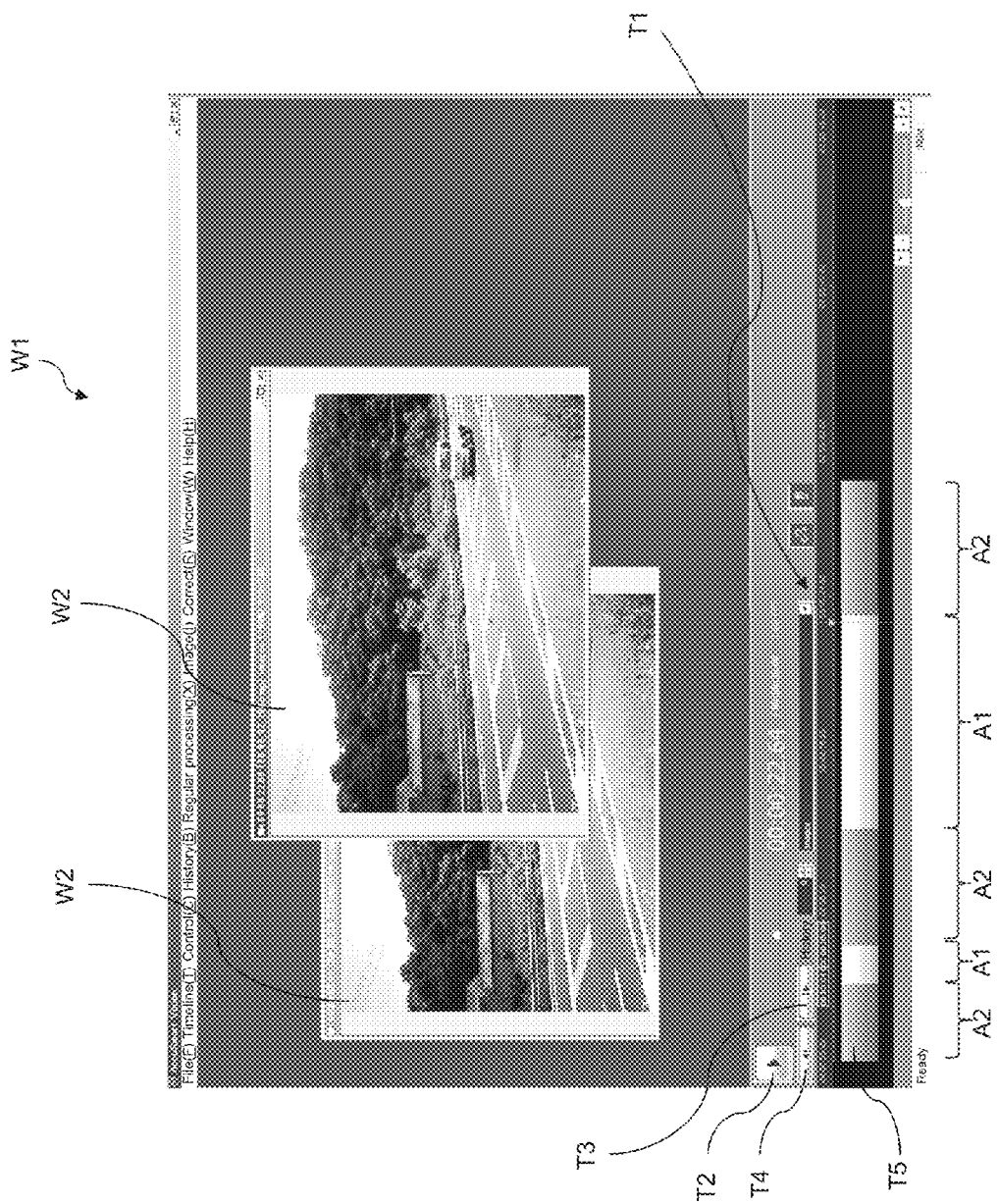
FIG. 3 shows the basic screen after image data has been loaded.

The control unit 40 can reproduce, within the display window W2, the still image file group corresponding to that display window W2 as a moving image. As shown in FIG. 3, the control unit 40 displays a window selection pull-down menu T1, a reproduce button T2, a frame forward button T3, a frame back button T4, and a timeline bar T5 on the basic screen W1.

Even when there is a plurality of display windows W2, only one of those display windows W2 is active. The window selection pull-down menu T1 receives the selection of which display window W2 is to be made active from the user. Hereinafter, a still image file group corresponding to an active display window W2 will be referred to as "active file group".

Moreover, a frame that is currently displayed in an active display window W2 will be referred to as "active display frame".

The reproduce button T2 receives a command from the user to reproduce the active file group as a moving image. When the control unit 40 detects that the user has pressed the reproduce button T2 through the input unit 20, the control unit 40 displays frames of the active file group in the active display window W2 in such a manner that the frames are sequentially displayed along the timeline. It should be noted that the reproduction begins with an active display frame at the point in time when the reproduce button T2 is pressed. Moreover, the reproduce button T2 receives a command from the user to stop reproduction. When the control unit 40 detects that the user has pressed the reproduce button T2 through the input unit 20 during reproduction, the control unit 40 fixes the display in the active display window W2 to an active display frame at that point in time.

The frame forward button T3 and the frame back button T4 respectively receive commands from the user to change the active display frame to a frame directly after and directly before that active display frame along the timeline of the active file group.

The timeline bar T5 graphically represents the timeline of the active file group. The timeline bar T5 is equally divided in an extending direction of the bar into the same number of parts as the number of frames of the active file group. An "n"th divided region from the left on the timeline bar T5 corresponds to an "n"th frame of the active file group on the timeline ("n" is a natural number).

As shown in FIG. 3, in the timeline bar T5, divided regions A1 corresponding to a selected frame group and divided regions A2 corresponding to a non-selected frame group are displayed differently. "Selected frame group" refers to a frame group corresponding to a section that is currently selected on the timeline of the active file group. "Non-selected frame group" refers to a frame group corresponding to a section that is not currently selected on the timeline of the active file group. In the present embodiment, the region A1 is displayed in a light tone of color, and the region A2 is displayed in a dark tone of color.

The timeline bar T5 receives the selection of any section of the active file group on the timeline from the user. The section that is selected may be a continuous section or may be a discontinuous section. In other words, the user can select any number of any frames out of all the frames of the active file group by operating the timeline bar T5 through the input unit 20. Specifically, the user selects a divided region corresponding to a frame that he/she desires to select on the timeline bar T5. It is possible to select a plurality of divided regions at the same time. The control unit 40 recognizes the selected frame group as the target of image processing that will be described later. It should be noted that each time the user selects a divided region on the timeline bar T5, the active display frame is changed to a frame corresponding to the latest selected divided region.

2-3. Image Processing

Hereinafter, image processing of the selected frame group will be described. The control unit 40 can execute a plurality of image processing modules, such as noise removal (Gaussian noise removal, bilateral filtering, median filtering, k-nearest neighbor smoothing, and mosquito noise removal), sharpness, brightness/contrast/saturation adjustment, image resolution, rotation, and addition of characters/arrows/mosaics. The image processing modules are incorporated in the image processing program 2.

The user can select any modules of the image processing modules in any order and any number of times by operating the basic screen W1 through the input unit 20. If necessary, the user inputs a parameter that is used during execution of an image processing module at the same time as he/she selects that image processing module. Each time the control unit 40 detects that the user has selected an image processing module, the control unit 40 executes that image processing module on the selected frame group. It should be noted that executing an image processing module on a selected frame group means executing that image processing module on each frame contained in that selected frame group.

As image processing modules are executed on a frame sequentially, that is, once, twice, thrice, and so on, the frame is sequentially manipulated into a first-order frame, a second-order frame, a third-order frame, and so on. A zeroth-order frame corresponds to a still image file stored in the original image region 51. An (m+1)th-order frame corresponds to a still image file after an image processing module is executed once on an "m"th-order frame ("m" is an integer of 0 or more). As image processing modules are sequentially executed, still image files corresponding to the first-order and subsequent frames are sequentially generated. These still image files are stored in the manipulated file region 52 as separate files. Accordingly, the control unit 40 can display within the display window W2 still image files stored in the original image region 51 and in the manipulated file region 52 while changing the currently displayed still image file as appropriate in response to a user operation.

2-3-1. Mosquito Noise Removal Process

Next, a mosquito noise removal process, which is one of noise removal techniques implemented in the image processing apparatus 1, will be described. Mosquito noise is noise that mainly occurs at sharp contour portions in an image during compression of image data with a compression format such as JPEG, MPEG, or the like. The mosquito noise removal process is a process of removing mosquito noise in the images of a still image file group in a JPEG compression format that have been loaded into the original image region 51 from a still image file in a JPEG compression format or a moving image file in an MPEG compression format. In the mosquito noise removal process, an ϵ (epsilon) filter is used. An ϵ filter is a nonlinear filter for removing mosquito noise in an image while preserving steep changes in pixel value at sharp contour portions and the like in that image.

Figure 4:
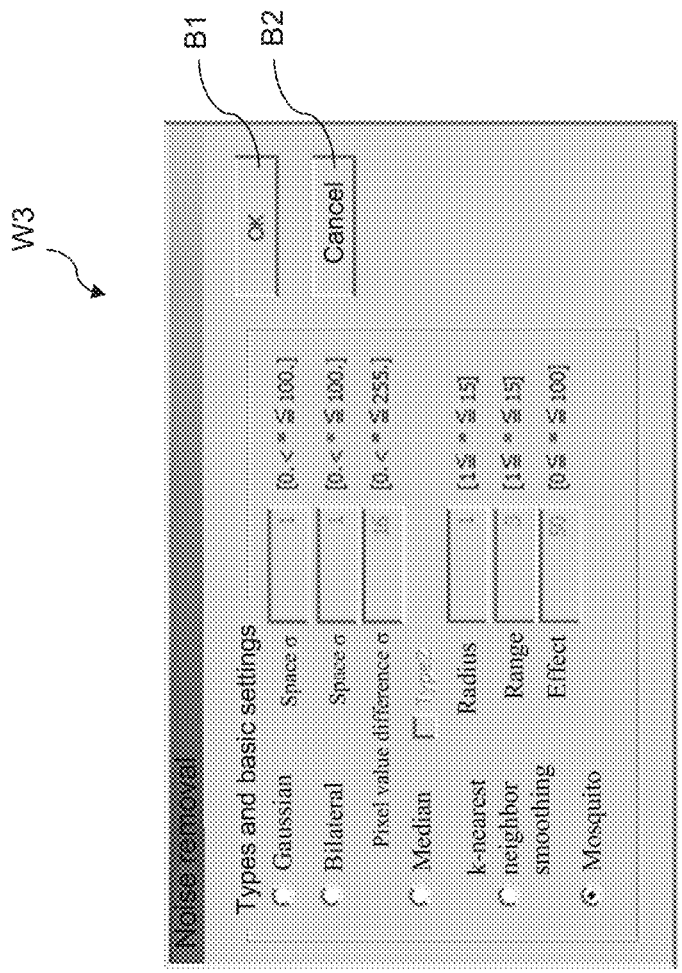
FIG. 4 shows a noise removal window.

When the control unit 40 detects that the user has performed a predetermined operation on the basic screen W1 through the input unit 20, the control unit 40 displays a noise removal window W3 (see FIG. 4) such that this window is laid on the basic screen W1. The noise removal window W3 is a window that receives, from the user, the selection of a noise removal algorithm to be executed from among Gaussian noise removal, bilateral filtering, median filtering, k-nearest neighbor smoothing, and mosquito noise removal.

The noise removal window W3 displays an execution button B1 and a cancel button B2. When the control unit 40 detects that the user has pressed the execution button B1 through the input unit 20 in a state in which a single noise removal algorithm has been selected on the noise removal window W3, the control unit 40 starts execution of an image processing module of that algorithm.

Figure 5:
FIG. 5 is a flowchart of a mosquito noise removal process.

When the execution button B1 is pressed in a state in which the mosquito noise removal is selected on the noise removal window W3, the mosquito noise removal process illustrated in FIG. 5 is started. The mosquito noise removal process is executed on the selected frame group as described above, but for the sake of simplicity, it is assumed below that at the start of the mosquito noise removal process, a single, color digitally compressed image (hereinafter "target frame $F_t$") that is in the RGB color system and is compressed with a JPEG compression format has previously been selected as the selected frame group.

As illustrated in FIG. 5, in the mosquito noise removal process, first, steps S11 to S14 are repeatedly executed on each pixel $X_{i,j}$ contained in the target frame $F_t$. It should be noted that the pixel $X_{i,j}$ refers to a pixel in an "i"th row from the top and a "j"th column from the left of the target frame $F_t$ (see FIG. 6). Moreover, the target frame $F_t$ has a size of I vertical pixels×J horizontal pixels, and "i" and "j" are integer values satisfying $1 \le i \le I$ and $1 \le j \le J$, respectively. Details of steps S11 to S14 executed on each pixel $X_{i,j}$ contained in the target frame $F_t$ are as described below.

In step S11, the σ calculation portion 41 calculates a standard deviation $\sigma_{i,j}$ (R) of R values (pixel values) of N×N pixels contained in a square region (hereinafter "N×N region") $G_{i,j}$. The N×N region $G_{i,j}$ is centered on the pixel $X_{i,j}$ and has a size of N vertical pixels×N horizontal pixels. It should be noted that in the present embodiment, N is 7. Accordingly, in the present embodiment, the standard deviation $\sigma_{i,j}$(R) of 49 R values below is calculated. Here, the R value of the pixel $X_{i,j}$ is expressed as $x_{i,j}$(R).

$$x_{i-3,j-3}(R), x_{i-2,j-3}(R), \ldots, x_{i+2,j-3}(R), x_{i+3,j-3}(R),$$
$$x_{i-3,j-2}(R), x_{i-2,j-2}(R), \ldots, x_{i+2,j-2}(R), x_{i+3,j-2}(R),$$
$$\ldots,$$
$$x_{i-3,j+2}(R), x_{i-2,j+2}(R), \ldots, x_{i+2,j+2}(R), x_{i+3,j+2}(R),$$
$$x_{i-3,j+3}(R), x_{i-2,j+3}(R), \ldots, x_{i+2,j+3}(R), x_{i+3,j+3}(R)$$

In step S12, the σ calculation portion 41 calculates a standard deviation $\sigma_{i,j}$(G) of G values (pixel values) of the N×N pixels contained in the N×N region $G_{i,j}$. Accordingly, in the present embodiment, the standard deviation $\sigma_{i,j}$(G) of 49 G values below is calculated. Here, the G value of the pixel $X_{i,j}$ is expressed as $x_{i,j}$(G).

$$x_{i-3,j-3}(G), x_{i-2,j-3}(G), \ldots, x_{i+2,j-3}(G), x_{i+3,j-3}(G),$$
$$x_{i-3,j-2}(G), x_{i-2,j-2}(G), \ldots, x_{i+2,j-2}(G), x_{i+3,j-2}(G),$$
$$\ldots,$$
$$x_{i-3,j+2}(G), x_{i-2,j+2}(G), \ldots, x_{i+2,j+2}(G), x_{i+3,j+2}(G),$$
$$x_{i-3,j+3}(G), x_{i-2,j+3}(G), \ldots, x_{i+2,j+3}(G), x_{i+3,j+3}(G)$$

In step S13, the σ calculation portion 41 calculates a standard deviation $\sigma_{i,j}$ (B) of B values (pixel values) of the N×N pixels contained in the N×N region $G_{i,j}$. Accordingly, in the present embodiment, the standard deviation $\sigma_{i,j}$(B) of 49 B values below is calculated. Here, the B value of the pixel $X_{i,j}$ is expressed as $x_{i,j}$ (B).

$$x_{i-3,j-3}(B), x_{i-2,j-3}(B), \ldots, x_{i+2,j-3}(B), x_{i+3,j-3}(B),$$
$$x_{i-3,j-2}(B), x_{i-2,j-2}(B), \ldots, x_{i+2,j-2}(B), x_{i+3,j-2}(B),$$
$$\ldots,$$
$$x_{i-3,j+2}(B), x_{i-2,j+2}(B), \ldots, x_{i+2,j+2}(B), x_{i+3,j+2}(B),$$
$$x_{i-3,j+3}(B), x_{i-2,j+3}(B), \ldots, x_{i+2,j+3}(B), x_{i+3,j+3}(B)$$

That is to say, in steps S11 to S13, the standard deviation corresponding to the pixel $X_{i,j}$ is calculated for each of the R, G, and B color components.

Subsequently, in step S14, the ε deriving portion 42 derives the greatest value of the three standard deviations that have been calculated for the pixel $X_{i,j}$ in the immediately preceding steps S11 to S13 and that respectively correspond to the three color components of R, G, and B, and sets this greatest value as an ε (epsilon) value of the ε filter for the pixel $X_{i,j}$. Accordingly, in the present embodiment, the greatest value of the three standard deviations below is derived as the $\epsilon_{i,j}$ value.

$\sigma_{i,j}$ (R), $\sigma_{i,j}$ (G), $\sigma_{i,j}$ (B)

Thus, before the subsequent steps S15 and S16 are executed, ε values of the ε filter for all of the pixels contained in the target frame $F_t$ are derived. The ε values for all of the pixels contained in the target frame $F_t$ are represented by a matrix below. Steps S15 and S16 are the processing of applying the ε filter to the target frame $F_t$.

$$\varepsilon_{1,1}, \varepsilon_{2,1}, \ldots, \varepsilon_{I-1,1}, \varepsilon_{I,1},$$
$$\varepsilon_{1,2}, \varepsilon_{2,2}, \ldots, \varepsilon_{I-1,2}, \varepsilon_{I,2},$$
$$\ldots,$$
$$\varepsilon_{1,J-1}, \varepsilon_{2,J-1}, \ldots, \varepsilon_{I-1,J-1}, \varepsilon_{I,J-1},$$
$$\varepsilon_{1,J}, \varepsilon_{2,J}, \ldots, \varepsilon_{I-1,J}, \varepsilon_{I,J}$$

As illustrated in FIG. 5, steps S15 and S16 are executed for each color component. Moreover, as illustrated in FIG. 5, steps S15 and S16 are repeatedly executed on each pixel $X_{i,j}$ contained in the target frame $F_t$. Details of steps S15 and S16 executed on each pixel $X_{i,j}$ contained in the target frame $F_t$ are as described below.

In step S15, the filtering portion 43 extracts one or more pixel values that are, among pixel values of M×M pixels contained in a square region (hereinafter "M×M region") $H_{i,j}$ within a range from a pixel value $x_{i,j}$-ε to a pixel value $x_{i,j}$+ε. The M×M region $H_{i,j}$ is centered on the pixel $X_{i,j}$ and has a size of M vertical pixels×M horizontal pixels. It should be noted that in the present embodiment, M is 7. Moreover, the pixel value $x_{i,j}$ refers to $x_{i,j}$ (R) when processing for the R color component is executed, $x_{i,j}$ (G) when processing for the G color component is executed, and $x_{i,j}$ (B) when processing for the B color component is executed. More precisely, in step S15, all the pixel values $x_{t,s}$ that satisfy the condition $x_{i,j}+\epsilon_{t,s} \le x_{t,s} \le x_{i,j}+\epsilon_{t,s}$, among the pixel values of the M×M pixels contained in the M×M region $H_{i,j}$, are extracted (where "t" is a positive integer that satisfies $i-3 \le t \le i+3$, and "s" is a positive integer that satisfies $j-3 \le s \le j+3$). As illustrated in FIG. 5, step S15 is realized by running duplicate loops of "t" and "s" to repeat M×M times processing in which it is determined whether or not the condition $x_{i,j}-\epsilon_{t,s} \le x_{t,s} \le x_{i,j}+\epsilon_{t,s}$ is satisfied, and then the pixel value $x_{t,s}$ is extracted if the condition is satisfied.

In the subsequent step S16, the filtering portion 43 calculates an arithmetic mean value of one or more pixel values $x_{t,s}$ that have been extracted in the immediately preceding step S15, and sets this arithmetic mean value as a corrected value $y_{i,j}$ of the pixel value $x_{i,j}$. The corrected value $y_{i,j}$ of the pixel value $x_{i,j}$ is a value obtained by removing mosquito noise from the pixel value $x_{i,j}$. It should be noted that the corrected value $y_{i,j}$ refers to $y_{i,j}$ (R) when processing for the R color component is executed, $y_{i,j}$ (G) when processing for the G color component is executed, and $y_{i,j}$ (B) when processing for the B color component is executed. Here, $y_{i,j}$ (R) is the corrected value of $x_{i,j}$ (R), $y_{i,j}$ (G) is the corrected value of $x_{i,j}$ (G), and $y_{i,j}$ (B) is the corrected value of $x_{i,j}$ (B).

When steps S15 and S16, which are repeated I×J times for each component of the R color component, the B color component, and the G color component, have been finished, the mosquito noise removal process is ended.

3. Applications

As described above, irrespective of whether the image processing program 2 loads image data from a still image file or a moving image file, the image processing program 2 manages the loaded image data as a still image file group. Therefore, the image processing program 2 can easily meet the user's request to perform image processing as desired by him/her on any frame in the same timeline. Moreover, the image processing program 2 has a function of reproducing the still image file group as a moving image. Consequently, even though the image data is treated as the still image file group in the image processing program 2, the user can recognize that image data as a moving image. Therefore, the image processing program 2 is particularly useful in instances where a moving image is analyzed, edited, and so on.

The image processing program 2 can deal with image processing on various kinds of moving images, and can be used, for example, in order for an organization such as the police to analyze a monitoring image from a security camera for investigation of a case. The mosquito noise removal process according to the present embodiment is particularly useful in removing mosquito noise from a monitoring image recorded in a compression format such as JPEG or MPEG.

4. Features 4-1

In the above-described embodiment, in order to remove mosquito noise from the target frame $F_t$ having a size of I vertical pixels×J horizontal pixels, steps S11 to S16 are repeatedly executed I×J times. The σ calculation portion 41 repeats steps S11 to S13 I×J times, thereby calculating, for each pixel $X_{i,j}$ contained in the target frame $F_t$ and for each of the RGB color components, a standard deviation of pixel values of N×N pixels contained in an N×N region $G_{i,j}$ centered on that pixel $X_{i,j}$. The ε deriving portion 42 repeats step S14 I×J times, thereby deriving, for each pixel $X_{i,j}$ contained in the target frame $F_t$, the greatest value of the three standard deviations $\sigma_{i,j}$ (R), $\sigma_{i,j}$ (G), and $\sigma_{i,j}$ (B), which have been calculated for that pixel $X_{i,j}$ and respectively correspond to the three color components, as the $\epsilon_{i,j}$ value of the ε filter for that pixel $X_{i,j}$. The filtering portion 43 repeats steps S15 and S16 I×J times for each of the RGB color components, thereby applying the ε filter to the target frame $F_t$.

That is to say, for each pixel $X_{i,j}$ contained in the target frame $F_t$, the standard deviation of pixel values is calculated on a color component-by-color component basis, in a unit of N×N region $G_{i,j}$. Accordingly, the sensitivity for detecting a contour line between objects that are different in terms of the saturation, hue, or the like is increased, and therefore it is possible to appropriately suppress the mosquito noise. Furthermore, as the $\epsilon_{i,j}$ value of the ε filter for each pixel $X_{i,j}$ contained in the target frame $F_t$, the maximum value of the three standard deviations $\sigma_{i,j}$ (R), $\sigma_{i,j}$ (G), and $\sigma_{i,j}$ (B), which have been calculated for that pixel $X_{i,j}$, is calculated. Thus, the $\epsilon_{i,j}$ value is a value obtained by taking the plurality of color components into account, so that it is possible to detect a contour line that would be undetectable with an $\epsilon_{i,j}$ value based on the luminance, a single color component, or the like, and therefore to appropriately suppress the mosquito noise. Accordingly, it is possible to highly precisely remove the mosquito noise from the target frame $F_t$.

4-2

The filtering portion 43 repeats steps S15 and S16, thereby calculating, for each pixel $X_{i,j}$ contained in the target frame $F_t$ and for each of the RGB color components, an arithmetic mean value of one or more pixel values that are among pixel values of M×M pixels contained in an M×M region $H_{i,j}$ centered on that pixel $X_{i,j}$ and that satisfy the condition of not less than $(x_{i,j}-\epsilon)$ and not more than $(x_{i,j}+\epsilon)$, as the corrected value $y_{i,j}$ of the pixel value $x_{i,j}$ of that pixel $X_{i,j}$. That is to say, for each pixel $X_{i,j}$ contained in the target frame $F_t$, an arithmetic mean value of pixel values is calculated in a unit of M×M region $H_{i,j}$ on a color component-by-color component basis, and is set as the corrected value $y_{i,j}$ of the pixel value $x_{i,j}$ of that pixel $X_{i,j}$ on a color component-by-color component basis. Thus, the corrected values $y_{i,j}$, in which mosquito noise is appropriately removed, of the respective pixel values $x_{i,j}$ are calculated.

4-3

In the above-described embodiment, the target frame $F_t$ is filtered with the filter for each of the RGB color components. It should be noted that the $\epsilon_{i,j}$ value of the ε filter is shared by the three color components. Accordingly, it is possible to highly precisely remove mosquito noise from a color target frame $F_t$ having a plurality of color components.

4-4

The N×N region $G_{i,j}$ and the M×M region $H_{i,j}$ are regions centered on the pixel $X_{i,j}$ of interest. Thus, a population of values that serve as the basis for calculation of the standard deviation $\sigma_{i,j}$ and the $\epsilon_{i,j}$ value is set appropriately.

5. Variations

Although an embodiment of the present invention has been described above, the present invention is not limited to the above embodiment, and various changes can be made thereto without departing from the gist of the present invention. For example, the following changes can be made.

5-1

The region $G_{i,j}$ is not necessarily required to be square like an N×N region, and may also have various outer shapes such as a circular shape, an elliptical shape, a rectangular shape, a triangular shape, and a pentagonal shape. Moreover, the region $G_{i,j}$ may lack a portion inside of the outer shape. The same applies to the region $H_{i,j}$.

5-2

In the above-described embodiment, the region $G_{i,j}$ was set so as to be centered on the pixel $X_{i,j}$, but the region $G_{i,j}$ may also be set as various regions in which the pixel $X_{i,j}$ serves as a representative pixel. However, preferably, the pixel $X_{i,j}$, which serves as the representative pixel of the region $G_{i,j}$, is a pixel approximately at the center of the region $G_{i,j}$. For example, in the case where the region $G_{i,j}$ is a square region having a size of an even number of pixels×the even number of pixels, it is not possible to specify only one pixel at the center of the region $G_{i,j}$, and therefore it is preferable to set a pixel near the center of the region $G_{i,j}$ as the representative pixel. The same applies to cases where the region $G_{i,j}$ has shapes as described in the variation 5-1. It should be noted that in the case where a region $G_{i,j}$ lacks a portion inside of the outer shape, it is preferable to set a pixel near the center of the outer shape of that region $G_{i,j}$ as the representative pixel. The same applies to the region $H_{i,j}$.

5-3

In the above-described embodiment, a case where the mosquito noise removal process is applied to a color image in the RGB color system has been described as an example, but the mosquito noise removal process can also be applied to color images in other color systems such as the YCbCr color system. In addition, in whichever color system the target color image is, in the mosquito noise removal process, it is desirable that pixel values are computed for each color component. The reason for this is that if pixel values were not computed for each color component, a contour line between objects that are the same in terms of the luminance or brightness but is different in terms of the saturation, hue, or the like would be difficult to detect and therefore mosquito noise could not be appropriately suppressed.

5-4

In step S14, the greatest value of the three standard deviations was selected as it is as the value; however, a corrected value of the greatest value may also be selected. For example, a value obtained by correcting the greatest value in accordance with a predetermined algorithm by, for example, adding a predetermined factor to the greatest value, subtracting a predetermined factor from the greatest value, multiplying the greatest value by a predetermined factor, or dividing the greatest value by a predetermined factor may be selected as the value as appropriate.

5-5

In steps S11 to S14, the standard deviations were calculated, but any indicator, such as variance, that indicates dispersion of a population may be calculated instead. This variation may need to be combined with the variation 5-4.

5-6

In step S16, as the method for calculating the representative value of pixel values of M×M pixels contained in the M×M region $H_{i,j}$, instead of calculating the arithmetic mean value, various other methods for averaging those pixel values, for example, calculating a geometric mean value, a harmonic mean value, or the like, can be selected as appropriate.

5-7

The values of N and M can be set freely. The values of N and M may be the same value as in the case of the above-described embodiment, or may be different values. Furthermore, it is also possible to not allow the user to set the values of N and M.

5-8

Although the above-described embodiment was configured so that steps S11 to S14 and steps S15 and S16 are sequential processing, at least a portion thereof may be parallelized. For example, after steps S11 to S14 with respect to pixels in the upper half of the target frame $F_t$ have been finished, it is possible to start execution of step S15 while executing steps S11 to S14 with respect to pixels in the lower half of the target frame $F_t$.

5-9

The above-described embodiment was configured so that any image data loaded into the original image region 51 is stored as a still image file. However, it is also possible to store the image data loaded into the original image region 51 as a moving image file. Whether the image data in the original image region 51 is stored in a still image format or a moving image format may be user-selectable or may be automatically determined according to the format or the like of the source image data. Furthermore, after that, if the moving image file is subjected to image processing, the image data after this image processing may also be stored in the format of the moving image file.

The invention claimed is:

1. An image processing apparatus configured to eliminate mosquito noise from a digitally compressed image having a plurality of color components, the apparatus comprising:
    a dispersion calculation portion of a control unit configured to calculate, on a color component-by-color component basis, for each pixel contained in the digitally compressed image, a dispersion of pixel values of a plurality of pixels contained in a first region in which that pixel serves as a representative pixel;
    an ∈ deriving portion of the control unit configured to derive, for each pixel contained in the digitally compressed image, a greatest value of the plurality of dispersions that respectively correspond to the plurality of color components of that pixel, or a corrected value of the greatest value, as an ∈ value of an ∈ filter for that pixel; and
    a filtering portion of the control unit configured to apply the ∈ filter to the digitally compressed image.

2. The image processing apparatus according to claim 1, wherein the filtering portion is configured to apply the ∈ filter to the digitally compressed image on a color component-by-color component basis.

3. The image processing apparatus according to claim 1, wherein the representative pixel of the first region is a pixel approximately at a center of the first region.

4. The image processing apparatus according to claim 2, wherein the representative pixel of the first region is a pixel approximately at a center of the first region.

5. The image processing apparatus according to claim 1, wherein for each pixel contained in the digitally compressed image, the filtering portion is configured to calculate, as a corrected value of a pixel value of that pixel, a representative value of one or more pixel values that are, among pixel values of a plurality of pixels contained in a second region in which that pixel serves as a representative pixel, within a predetermined dispersion range based on the ∈ value relative to the pixel value of that pixel.

6. The image processing apparatus according to claim 2, wherein for each pixel contained in the digitally compressed image, the filtering portion is configured to calculate, as a corrected value of a pixel value of that pixel, a representative value of one or more pixel values that are, among pixel values of a plurality of pixels contained in a second region in which that pixel serves as a representative pixel, within a predetermined dispersion range based on the ∈ value relative to the pixel value of that pixel.

7. The image processing apparatus according to claim 3, wherein for each pixel contained in the digitally compressed image, the filtering portion is configured to calculate, as a corrected value of a pixel value of that pixel, a representative value of one or more pixel values that are, among pixel values of a plurality of pixels contained in a second region in which that pixel serves as a representative pixel, within a predetermined dispersion range based on the ∈ value relative to the pixel value of that pixel.

8. The image processing apparatus according to claim 5, wherein for each pixel contained in the digitally compressed image, the filtering portion is configured to calculate, as the corrected value of the pixel value of that pixel, an average value of one or more pixel values that are, among the pixel values of the plurality of pixels contained in the second region in which that pixel serves as the representative pixel, within the predetermined dispersion range based on the ∈ value relative to the pixel value of that pixel.

9. The image processing apparatus according to claim 5, wherein the second region is equal to the first region.

10. The image processing apparatus according to claim 8, wherein the second region is equal to the first region.

11. The image processing apparatus according to claim 1, wherein processing for calculating the dispersions by the dispersion calculation portion and processing for deriving the greatest value or the corrected value thereof by the ∈ deriving portion are configured to be executed in parallel.

12. The image processing apparatus according to claim 2, wherein processing for calculating the dispersions by the dispersion calculation portion and processing for deriving the greatest value or the corrected value thereof by the $\epsilon$ deriving portion are configured to be executed in parallel.

13. The image processing apparatus according to claim 3, wherein processing for calculating the dispersions by the dispersion calculation portion and processing for deriving the greatest value or the corrected value thereof by the $\epsilon$ deriving portion are configured to be executed in parallel.

14. The image processing apparatus according to claim 5, wherein processing for calculating the dispersions by the dispersion calculation portion and processing for deriving the greatest value or the corrected value thereof by the $\epsilon$ deriving portion are configured to be executed in parallel.

15. The image processing apparatus according to claim 8, wherein processing for calculating the dispersions by the dispersion calculation portion and processing for deriving the greatest value or the corrected value thereof by the $\epsilon$ deriving portion are configured to be executed in parallel.

16. The image processing apparatus according to claim 9, wherein processing for calculating the dispersions by the dispersion calculation portion and processing for deriving the greatest value or the corrected value thereof by the $\epsilon$ deriving portion are configured to be executed in parallel.

17. A non-transitory computer-readable recording medium storing an image processing program configured to eliminate mosquito noise from a digitally compressed image having a plurality of color components, the image processing program causing a computer to execute steps of:
   calculating on a color component-by-color component basis, for each pixel contained in the digitally compressed image, a dispersion of pixel values of a plurality of pixels contained in a first region in which that pixel serves as a representative pixel;
   deriving, for each pixel contained in the digitally compressed image, a greatest value of the plurality of dispersions that respectively correspond to the plurality of color components of that pixel, or a corrected value of the greatest value, as an $\epsilon$ value of an $\epsilon$ filter for that pixel; and
   applying the $\epsilon$ filter to the digitally compressed image.

18. The non-transitory computer-readable recording medium according to claim 17, wherein the applying the $\epsilon$ filter includes applying the $\epsilon$ filter to the digitally compressed image on a color component-by-color component basis.

19. A method of image processing for eliminating mosquito noise from a digitally compressed image having a plurality of color components, the method comprising steps of:
   calculating by using a computer, on a color component-by-color component basis, for each pixel contained in the digitally compressed image, a dispersion of pixel values of a plurality of pixels contained in a first region in which that pixel serves as a representative pixel;
   deriving by using the computer, for each pixel contained in the digitally compressed image, a greatest value of the plurality of dispersions that respectively correspond to the plurality of color components of that pixel, or a corrected value of the greatest value, as an $\epsilon$ value of an $\epsilon$ filter for that pixel; and
   applying by using the computer, the $\epsilon$ filter to the digitally compressed image.

20. The method of image processing according to claim 19, wherein the applying by using the computer, the $\epsilon$ filter includes applying by using the computer, the $\epsilon$ filter to the digitally compressed image on a color component-by-color component basis.

* * * * *